United States Patent Office 2,981,591
Patented Apr. 25, 1961

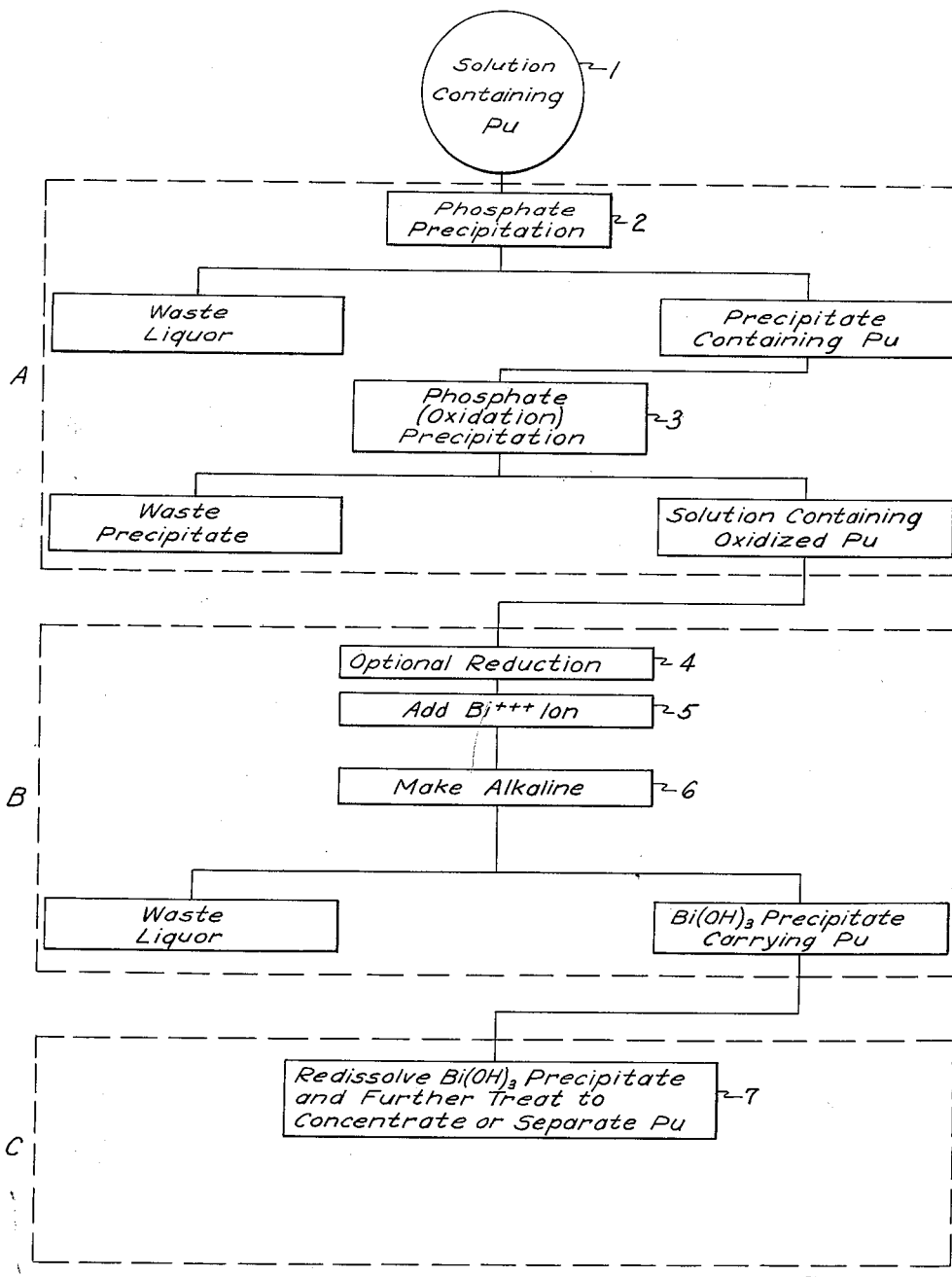

2,981,591

METHOD FOR RECOVERING PLUTONIUM VALUES FROM SOLUTION USING A BISMUTH HYDROXIDE CARRIER PRECIPITATE

Burt F. Faris, Oak Ridge, Tenn., assignor to the United States of America as represented by the United States Atomic Energy Commission Filed Sept. 2, 1944, Ser. No. 552,546

2 Claims. (Cl. 23—14.5)

This invention relates to a procedure for separating plutonium from extraneous matter particularly substances of the kind present in neutron irradiated uranium such as uranium, fission products, and the like. More particularly, this invention concerns a separatory and concentration procedure involving the use of a bismuth hydroxide carrier.

As described herein, the isotope of element 94 having a mass of 239 is referred to as $94^{239}$ and is also called plutonium, symbol Pu. In addition, the isotope of element 93 having a mass of 239 is referred to as $93^{239}$. Reference herein to any of the elements is to be understood as denoting the element generically, whether in its free state or in the form of a compound, unless indicated otherwise by the context.

Elements 93 and 94 may be obtained from uranium by various processes which do not form a part of the present invention including irradiation of uranium with neutrons. Neutron irradiated uranium may be prepared by reacting uranium with neutrons from any suitable neutron source, but preferably the neutrons used are obtained from a chain reaction of neutrons with uranium.

Naturally occurring uranium contains a major portion of $_{92}U^{238}$, a minor portion of $_{92}U^{235}$, and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about 23 minutes and by beta decay becomes $93^{239}$. The $93^{239}$ has a half life of about 2.3 days and by beta decay becomes $94^{239}$. Thus, neutron irradiated uranium contains both $93^{239}$ and $94^{239}$ but by storing such irradiated uranium for a suitable period of time, the $93^{239}$ is converted almost entirely to $94^{239}$.

In addition to the above-mentioned reaction, the reaction of neutrons with fissionable nuclei such as the nucleus of $U^{235}$ results in the production of a large number of radioactive fission products. As it is undesirable to produce a large concentration of these fission products which must, in view of their high radioactivity, be separated from the $94^{239}$ and further as the weight of radioactive fission products present in neutron irradiated uranium is proportional to the amounts of $93^{239}$ and $94^{239}$ formed therein, it is preferable to discontinue the irradiation of the uranium by neutrons when the combined amount of $93^{239}$ and $94^{239}$ is equal to approximately 0.02 percent by weight of the uranium mass. At this concentration of these substances, the concentration of fission elements which must be removed is approximately the same percentage.

A number of processes have already been proposed for accomplishing the aforementioned separation and concentration of plutonium. Certain of these processes are known generically as dry processes and wet processes. For example, certain of the wet processes have involved the use of various types of carriers for carrying the product out of solution, alternate reduction and oxidation steps, and various other steps. Such processes have been conducted under acidic conditions, and have involved the use of reagents such as hydrogen fluoride. More specifically, certain of these processes are known as the bismuth phosphate process and lanthanum fluoride process. In some of the steps of these prior processes a special technique has been required for redissolving the carrier precipitate containing product. Also relatively large amounts of carrier precipitate and liquids are required to be handled in carrying out the prior processes. The meaning of the various items referred to above such as "carrier precipitate," the use of fluorides and other items will be further apparent as the description proceeds.

I have found a new method for accomplishing the aforementioned separation and concentration of plutonium wherein different types of reagents may be used and advantages obtained, not only in being able to accomplish separation by an alternative manner, but that reduction of carrier bulk and other advantages may be obtained in the process.

This invention has for one object, to provide a new method for the separation and recovery of plutonium.

Another object is to provide a method of separating plutonium by carrier procedure wherein a different type of carrier than has heretofore been used is employed.

Still another object is to provide a separatory and concentration process which may be operated under alkaline conditions as contrasted with acidic conditions employed in many of the processes heretofore practiced.

A still further object is to provide a process for separating Pu wherein substantial reduction of carrier bulk and extraneous materials may be accomplished.

Still another object is to provide a novel type of process for separating Pu which lends itself to coupling or adaptation with processes already known or practiced.

Another object is to provide a novel type of separatory process for the recovery of Pu which may be carried out in existing equipment without change, or with a minimum of equipment change.

Still another object is to provide a process for the recovery of Pu which may be applied to Pu containing solutions either in the reduced or oxidized state.

Another object is to provide a separatory and concentration process for Pu containing materials involving the use of a bismuth hydroxide carrier.

Still another object is to provide a process of the aforementioned type wherein at least a part of the carrier is formed from residual bismuth already in the solution being processed.

Other objects will appear hereinafter.

For a better understanding of the invention, reference is made to the attached drawing forming a part of the present application. In this drawing, a diagrammatic representation of one embodiment of the invention is given in the form of a flow sheet.

I have found that plutonium in admixture with various extraneous materials may be separated and concentrated by the use of a bismuth hydroxide carrier. That is, the present process is directed in certain phases to the use of a bismuth hydroxide carrier for Pu, particularly, where bismuth phosphate has been employed for the initial treatment of the materials from which the Pu is being separated. It has been found that under such circumstances the addition of large amounts of other carrier may be avoided, and that the bismuth ion already present may be utilized. While, as indicated, it is preferred to employ my process in conjunction with the bismuth phosphate process, it is to be noted that my process may also be carried out independently thereof.

The bismuth phosphate process is set forth in app. Ser. No. 519,714, filed January 26, 1944, Thompson and Seaborg, now U.S. Patent No. 2,785,951, issued March 19, 1957, and reference is made to that application for full disclosure of such process, details thereof being omitted from the present disclosure except where necessary to an understanding of the present invention. As set forth in said application, it has been discovered that plutonium has more than one oxidation state, including a lower oxidation state or states referred to herein as $Pu^{(r)}$ in which the element is characterized by forming insoluble phosphates and fluorides, and a higher oxidation state or states referred to as $Pu^{(o)}$ in which the element forms soluble phosphates and fluorides. As disclosed in appl. Ser. No. 519,714, the soluble plutonium phosphate in which plutonium is present in its higher oxidation state is referred to as plutonyl phosphate, $(PuO_2)_3(PO_4)_2$, Pu therein having a valence of six. As noted above, it is a feature of the present invention that plutonium may be carried by bismuth hydroxide particularly under alkaline conditions in either oxidation state.

In general, my separatory and concentration procedure for recovering plutonium is as follows: A quantity of processed uranium or salt thereof (neutron bombarded) is obtained. The particular source is not a limitation on my invention. In the operation of the invention the processed material is, of course, properly handled as respects aging or other treatment that may have been required so that there is present therein the desired plutonium in a suitable condition to be separated and concentrated. The uranium material is dissolved in a suitable solvent. For example, nitric acid may be used in this step for obtaining a uranium nitrate hexahydrate solution, referred to herein as UNH. The UNH solution is subjected to the action of a reducing agent which reduces the plutonium to its lower oxidized state $Pu^{(r)}$ without reducing the uranyl ion. The solution is then processed to separate the plutonium from the bulk of the uranium and the bulk of the fission products. This procedure may comprise treatment by the bismuth phosphate process of the case referred to above, app. Ser. No. 519,714 which includes precipitation of bismuth phosphate in the solution which carries out the $Pu^{(r)}$ (product precipitation), dissolution of the thus formed precipitate, oxidation of the Pu in the solution to the $Pu^{(o)}$ state, and precipitation of bismuth phosphate in the solution carrying fission products and leaving the plutonium in solution in the oxidized state (by-product precipitation). This cycle comprising alternate product and by-product precipitations may be repeated as often as is desired. Other similar extraction and decontamination processes involving alternate reducing and oxidizing conditions or not may be employed.

By the aforementioned procedure, by-products are eliminated to a substantial extent. That is, the product, Pu, is isolated from at least a part of the UNH and fission products or other contaminants and extraneous matter. At some suitable stage, when decontamination has been carried to a satisfactory point, and at a stage when oxidizing conditions prevail, a bismuth phosphate by-product precipitate is taken and the filtrate or centrifugate, depending upon the method of physical separation used in the process, is segregated as this contains the product Pu in an oxidized state.

Such oxidized solution, after having been subjected to such a bismuth phosphate by-product precipitation, contains from 10 to 100 mgs. of residual bismuth per liter, depending upon the concentration of iron present. Apparently the iron present complexes the bismuth and prevents complete precipitation as bismuth phosphate in the aforementioned by-product precipitation steps.

The preferred bismuth hydroxide process involves using the residual bismuth accompanied, if desired, by adding more bismuth after the aforementioned bismuth phosphate precipitation and making the solution alkaline with sodium or potassium hydroxide or equivalent hydroxide ion addition. In this manner a bismuth hydroxide carrier precipitate is formed by the reaction of the bismuth and hydroxide ions. The Pu is carried quantitatively by the bismuth hydroxide or mixed hydroxide of bismuth and iron which form. If the bismuth phosphate process is not used initially there will, of course, be no residual $Bi^{+++}$ present. In this event an addition of a source of bismuth ions may be made to supply sufficient bismuth ions for forming the bismuth hydroxide precipitate.

The amount of iron present is dependent upon factors such as the corrosion experienced in metal tanks used to carry out the process or to the carryover from a previous treatment wherein iron salts have been used as a reducing agent. In the event an interfering amount of iron is present, this may be rendered ineffective by prior treatment of the solution with sodium or potassium ferrocyanide. This precipitates iron, which precipitate may be separated before bismuth additions are made.

It has been found that although the Pu is probably in the reduced state, the compound formed from the aforementioned addition does not carry the Pu. It is thought that the added compound, as for example, $Na_4Fe(CN)_6$ reduces Pu and in addition reacts with ferric ions present to give $Fe_4[Fe(CN)_6]_3$. The latter compound does not appear to carry the Pu even though the Pu is in a reduced state.

The effectiveness of bismuth hydroxide for carrying plutonium under either oxidizing or reduced conditions is indicated in the following table:

| Valence State of Pu | Carrier Precipitate | Percent Pu in Precipitate | Percent Pu in Mother liquor |
|---|---|---|---|
| Reduced | Bismuth Hydroxide | 99.2 | .8 |
| Oxidized | do | 98.7 | 1.3 |

For further understanding of my invention, and a consideration of certain of the ancillary steps which may be used, such as the use of bismuth phosphate treatment referred to broadly above, a detailed example is set forth. In this example (Example I) the U has been properly processed by neutron bombardment and otherwise given such treatment as may be required to produce a content of Pu therein. The resultant U contains a small amount of plutonium which it is desired to separate.

The uranium is subjected to extraction and decontamination by any suitable process, a preferred process being that described in app. Ser. No. 519,714 aforementioned, filed January 26, 1944, Thompson and Seaborg, an embodiment of which is as follows: Neutron irradiated uranium is dissolved in a suitable quantity of 60–70% nitric acid. The solution is subjected to treatment with a reducing agent such as $H_2O_2$ in excess for a period of about one hour at a temperature from 50° C. to 75° C., whereby any of the Pu which may have been oxidized to the $Pu^{(o)}$ state in the solution step is reduced to the $Pu^{(r)}$ state. The concentration of the solution in the UNH is adjusted to 20% and $H_2SO_4$ is added to make the solution 1 N therein. To the solution is now added a source of bismuth ion to provide a concentration of bismuth ion equivalent to 10 grams of $Bi^{+3}$ ion in four liters of 20% UNH; phosphoric acid is also added to make the solution .36 M therein, and a precipitate comprising $BiPO_4$ which carries the $Pu^{(r)}$ comes down and is separated from the solution by filtration or centrifugation. The $BiPO_4$ precipitate carrying the $Pu^{(r)}$ is dissolved in 10 N $HNO_3$. The acidity of the solution is reduced to 6 N $HNO_3$ by dilution and the solution made .1 M in $K_2Cr_2O_7$. On heating the solution at 95° C. for 2.25 hours, the plutonium is oxidized to the $Pu^{(o)}$ state. The solution is then diluted to 1 N acidity by addition of water and $H_3PO_4$ added to provide a concentration of .05 M. The solution is heated to about 90° C. where-upon BiPO$_4$ precipitates carrying fission products but not Pu$^{(o)}$. The precipitate may be removed by filtration and discarded. If repetition of the cycle is contemplated for further decontamination, the Pu$^{(o)}$ in the filtrate is reduced by passing in a rapid stream of SO$_2$ gas for five minutes and allowing the solution to stand for approximately one hour and the cycle is suitably repeated.

This process removes most of the uranium and some of the fission products. The solution is then processed in accordance with the steps relating in particular to the present invention.

For a further general understanding of one embodiment of the process, reference is made to the attached drawing. The Pu containing solution to be treated is indicated at 1. In the cycle, A, the preliminary treatment for removing uranium and fission products is applied as above described. That is, several phosphate precipitations, as indicated at 2 and 3, may be applied until the desired decontamination is accomplished.

In cycle B, which will be described in detail hereinafter, the bismuth ion and hydroxide ion additions and other steps for forming a bismuth hydroxide precipitate, as indicated at 4, 5, and 6 are accomplished. This cycle may be repeated several times.

In cycle C it is to be noted that the bismuth hydroxide precipitates of the present invention readily dissolve in small amounts of dilute nitric acid, whereas bismuth phosphate precipitates require the use of concentrated acid and even then may go into solution slowly. Also in cycle C, it is generally indicated at 7 that such further treatment as is desired, may be applied.

Additional details respecting the process will be apparent from a consideration of the following examples.

*Example I*

Considering now the steps pertaining in particular to this invention, it will be noted as has been described above, that bismuth hydroxide will carry product in either the (r) or (o) state under alkaline conditions. Hence, the use of a reducing step, as the following, is optional.

The solution obtained from the bismuth phosphate process contains the product in the (o) state. The solution is subjected to a reducing treatment with H$_2$O$_2$. Other suitable reducing agents, preferably a non-metallic reducing agent may also be employed.

In using hydrogen peroxide, a concentration between .1%–1% is satisfactory. The reduction is accomplished in one-half to two hours at about 65° C. Excess peroxide is destroyed by boiling the solution. The acidity of the solution is maintained at about 1 N HNO$_3$ and 0.1 M H$_3$PO$_4$. The solution is agitated slowly.

The solution from the preceding treatments contains the residual bismuth (Bi$^{+++}$) ion. However, it may be desirable, either before or after the hydroxide ion addition to be described, to add a slight amount more of Bi ion. The content of residual Bi ion may be influenced by the type of reduction step preceding. For example, H$_2$O$_2$ reduction does not complex as much Bi as does Fe$^{++}$ reduction.

Sodium hydroxide (NaOH) or other suitable alkali such as potassium hydroxide (KOH), or ammonium hydroxide (NH$_4$OH) is added which will cause the formation of the bismuth hydroxide carrier from the residual and added Bi ion. This carries down Pu$^{(r)}$ substantially quantitatively.

This may be accomplished with an alkali addition sufficient to render the solution alkaline to litmus. The reaction time at a temperature from room temperature to 100° C. (60° C.–70° C. being preferred) is from one-half hour to two hours. The additions and reaction is accompanied by slow sweep agitation. The precipitate is centrifuged, and the centrifugate is discarded.

The precipitate of bismuth hydroxide containing product is redissolved in nitric acid, the resultant solution oxidized with sodium bismuthate, and the other steps applied as set forth above to obtain a bismuth phosphate by-product precipitate which is separated by centrifuging. The centrifugate liquid contains Pu$^{(o)}$.

The centrifugate containing Pu$^{(o)}$ may be reduced and further treated by the lanthanum fluoride or other product concentration procedure. Or the Pu may be precipitated as the oxide or other derivative for further use. In other words, after the product has been sufficiently decontaminated and concentrated, it may be further treated dependent upon the particular use for which it is to be employed.

In the preceding example, the process has been described as carried out completely with a number of steps some of which may be optional. In the examples which follow in the treatment of materials from other sources, my process may be shortened. In the examples which follow, it is to be noted that the solutions obtained have already been given preliminary treatments as may be desirable, such as extraction, decontamination, and the like.

*Example II*

In accordance with this example, the oxidized solution of Pu treated comprised a solution which was 1 M in nitric acid and 0.1 M in phosphoric acid obtained from prior bismuth phosphate precipitation steps. Potassium hydroxide was added to this solution as a 30% (6.9 M) solution until the solution was alkaline to litmus. The temperature was kept at approximately 80° C.–85° C. for one and one-half hours accompanied by fairly vigorous agitation. The resultant precipitate which formed was slimy. Centrifuging at 1500 G with an average retention time of 7–8 minutes removed 90% of the precipitate which included approximately 90% of the product Pu. On allowing the centrifugate to stand, an additional amount of precipitate carrying 8% of Pu was recoverable therefrom making a total recovery of approximately 98%. The product was carried through a BiPO$_4$ decontamination cycle followed by a further Bi(OH)$_3$ concentration step. Results both in product yield and decontamination were good as shown in the following table:

| | Total count Alpha per Min. | Vol., cc. | cc. HNO$_3$ required to dissolve | Gamma count |
|---|---|---|---|---|
| Solution containing Pu$^{(o)}$ | 48,300,000 | 144,000 | | 147,000 |
| 1st Bi(OH)$_3$ precipitate | 43,620,000 | | 430 | |
| 2nd Bi(OH)$_3$ precipitate | 41,000,000 | | 25 | 4,400 |

The count of 41 million of the 2nd precipitate compared with the 43 million of the 1st precipitate indicates a product recovery of greater than 94%.

The final volume of 25 cc. compared with the starting volume of 144,000 cc. illustrates the large overall volume concentration obtainable.

*Example III*

In accordance with this example, a solution which had been previously treated by standard bismuth phosphate extraction and decontamination and other steps of a type already described under app. Ser. No. 519,714, was processed. However, in this example the conditions of precipitation with bismuth hydroxide were modified in order to obtain a larger floc. The two main variables were the temperature and the agitation. In this example potassium hydroxide was added to the solution of oxidized product to make the solution alkaline to litmus (i.e. preferably a pH greater than 8), and the temperature allowed to rise to 100° C.–102° C. with slow agitation. Digestion at the aforementioned temperature was continued for approximately one-half hour, and then the resultant slurry was cooled and allowed to settle. Approximately 80% of the supernatant liquid was syphoned off. After removing the supernatant liquid, the remaining volume containing the suspended bismuth hydroxide carrier precipitate containing product was passed to the centrifuge. A good yield, namely 97–100% separation of bismuth hydroxide carrier precipitate with product was obtained. In both of the preceding examples, substantial concentration was obtained. The concentration factor represents the magnitude of the volume reduction, and is the quotient obtained from dividing the original volume by the reduced volume, as will be further apparent from the next example.

*Example IV*

In accordance with this example, approximately 18000 parts by volume of a 1 M nitric acid solution of Pu containing materials was processed by one cycle of concentration by bismuth hydroxide carrier precipitation in accordance with the present invention. The 18000 parts of solution treated had been previously subjected to bismuth phosphate product and by-product precipitation steps of the type set forth in application Ser. No. 519,714. The resultant solution containing product was in the oxidized state. After the treatment with alkali hydroxide to cause the formation of a bismuth hydroxide carrying precipitate, the resultant precipitate was satisfactorily dissolved in only 50 parts of 10 N nitric acid. In this example, therefore, concentration was from approximately an 18000 volume to a 50 volume or a concentration factor of about 360 was obtained. In other words, in operating my process on a large scale for each thousand gallons of solution containing $Pu^{(o)}$ in 1 N nitric acid, the volume of the product is approximately 3 gallons. Better than 91% of $Pu^{(o)}$ was recovered.

It is apparent from the foregoing that in accordance with the present invention there has been provided a method for carrying product Pu from solutions or suspensions wherein the product is in admixture with various amounts of extraneous material and large volumes of liquid. The product is carried in the bismuth hydroxide carrier precipitate to the extent of a greater than 90%. In certain cases, the carrying may be on the order of 97% to quantitative. In the instances where single precipitation does not carry all of the product or substantially all of the product, further bismuth salt, as for example bismuth nitrate, may be added and a second precipitation accomplished for removing any residual product not carried in the first precipitation cycle. The amount of solvent, such as nitric acid, required to redissolve a given quantity of bismuth hydroxide precipitate is substantially less than that required to initially dissolve a similar quantity of precipitate in the preliminary treatment, as for example, a bismuth phosphate product precipitate. Therefore, considerable concentration and reduction of volume of liquids handled is accomplished.

The foregoing precipitation steps may be repeated several times until volume reduction and decontamination have been accomplished to the desired extent. Thereafter the bismuth hydroxide precipitate carrying product Pu is redissolved and may be further treated.

As pointed out above, the present invention is particularly directed to the use of a bismuth hydroxide carrier precipitate, preferably said precipitate being formed at least in part from residual bismuth present in the Pu containing solutions undergoing processing. The use of my process permits obtaining volume reductions by factors greater than 300. My process may be repeated a plurality of times for obtaining concentration and volume reduction after which it may be coupled with the various other types of processes referred to above. Inasmuch as these other types of processes, per se, are not part of the present invention, they are only briefly referred to herein and are not claimed excepting insofar as they combine or couple with the bismuth hydroxide process of the present invention.

By such terms as carrying, carrier, or carrier precipitate employed herein is meant the formation and action of a precipitate in the removal of the product from solution which takes place when the bismuth hydroxide precipitate, or other type precipitate, is formed as illustrated by the preceding examples. By the use of the terms bismuth hydroxide precipitate, it is intended to include the type of precipitate which is formed by the addition of a source of hydroxide ions to solutions of the type described. This precipitate, as has been indicated, may not only comprise bismuth hydroxide but may contain minor quantities of bismuth phosphate and other hydroxides or phosphates, such as those of iron, depending upon the content of other components in the solution which form hydroxides. While certain temperatures, concentrations, and conditions have been specifically indicated in the description of my process for disclosing preferred conditions, these conditions may be varied for handling various materials. For example, the temperature of precipitation and digestion may be from 80° C.–125° C. As has been indicated, the plutonium containing materials resulting from certain types of processes may be treated substantially directly in accordance with my invention with, for example, only a single preceding preliminary step.

In the examples described herein, the quantity of Pu present varied from tracer amounts to 50 milligrams per liter of solution. However, I have found that my process may be applied when many times larger amounts of Pu are present, hence the particular amount of Pu present is not a limitation upon my invention. In the event that relatively large amounts of Pu are present, in keeping with good practice, the quantity of reagents and other additions would be varied accordingly.

The extent of decontamination of solutions or precipitates may be determined in accordance with a known technique such as making counts on the material by means of Geiger-Mueller counters or similar apparatus.

For example, from a comparison of the alpha activity exhibited by a certain volume or weight of solution before precipitation treatment, with the activity of the bismuth hydroxide precipitate from said solution the carrying of product may be determined. That is, Pu gives off alpha emission which may be counted, hence the amount of Pu carried out of the solution by the bismuth hydroxide carrier may be traced by the alpha count made on the precipitate. This type of procedure was employed in the measurements set forth in the table in Example II. The particular technique employed in this and certain other control steps is not a limitation upon the present invention. Furthermore, the handling of materials exhibiting radioactivity would be in accordance with the best technique available at the time the process was being carried out.

It is to be understood that all matter contained in the above description and examples shall be interpreted as illustrative and not limitative of the scope of this invention, and it is intended to claim the present invention as broadly as possible in view of the prior art.

I claim:

1. A process for the recovery and decontamination of plutonium values contained in an aqueous nitric acid solution of plutonium values and uranium fission product values derived from neutron irradiated uranium, which comprises maintaining the plutonium values in said solution in the hexavalent oxidation state, precipitating bismuth phosphate in said solution, separating the resulting precipitate and its associated uranium fission product values from the supernatant solution, precipitating bismuth hydroxide in the separated supernatant solution, digesting the resulting slurry at a temperature of 80–125° C., and separating the digested precipitate and its associated plutonium values from the supernatant liquid.

2. A process for the separation of plutonium values from an aqueous solution thereof containing iron contamination, which comprises precipitating the iron in said solution as ferric ferrocyanide, separating the resulting precipitate from the supernatant solution, precipitating bismuth hydroxide in the separated supernatant solution, and separating the bismuth hydroxide precipitate and its associated plutonium values from the supernatant liquid.

References Cited in the file of this patent

UNITED STATES PATENTS 2,785,951     Thompson et al. _____ Mar. 19, 1957

OTHER REFERENCES

Freundlich: Colloid and Capillary Chemistry (1922), transl. by Hatfield, pp. 220–2; pub. by E. P. Dulton and Co., N.Y.

Seaborg et al.: Journal of the American Chemical Society, vol. 70, pages 1128–1134; pub. March 1948, footnote shows date of prior knowledge of Mar. 21, 1942.

Seaborg et al.: IV–14A, the Transuranium Elements, page 221 (1954), pub. by McGraw-Hill, N.Y.

AEC Document N–2205, pages 3 and 38, Jan. 16, 1946, declassified Nov. 22, 1957 which refers to AEC Documents to Haeckl, CN–1762, page 26, July 1, 1944 (bibliographic reference 8); Faris and Strassel, CN–1116, page 28, Dec. 11, 1943 (bibliographic reference 9); Faris and Strassel, CN–1277, page 1, Feb. 15, 1944 (bibliographic reference 10). The dates of CN–1762, CN–1116, CN–1277 are relied on as evidence of prior use of knowledge under Section 155 of the Atomic Energy Act of 1954.